UNITED STATES PATENT OFFICE.

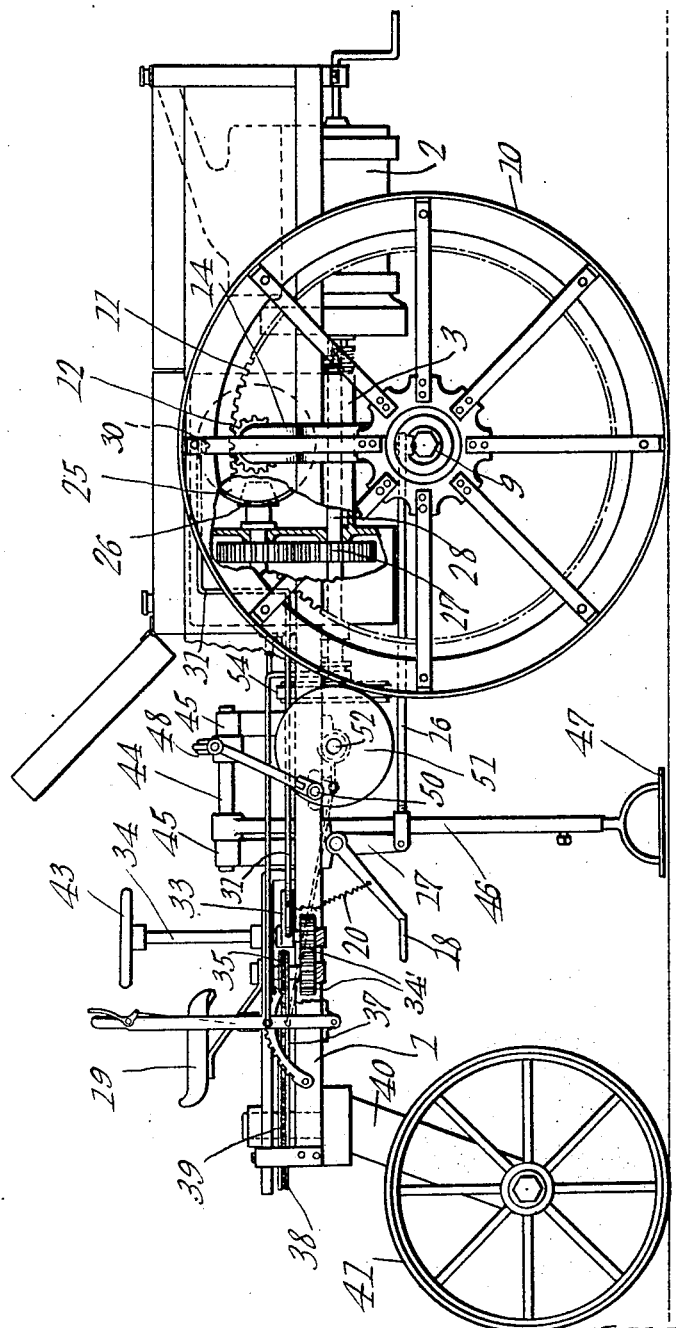

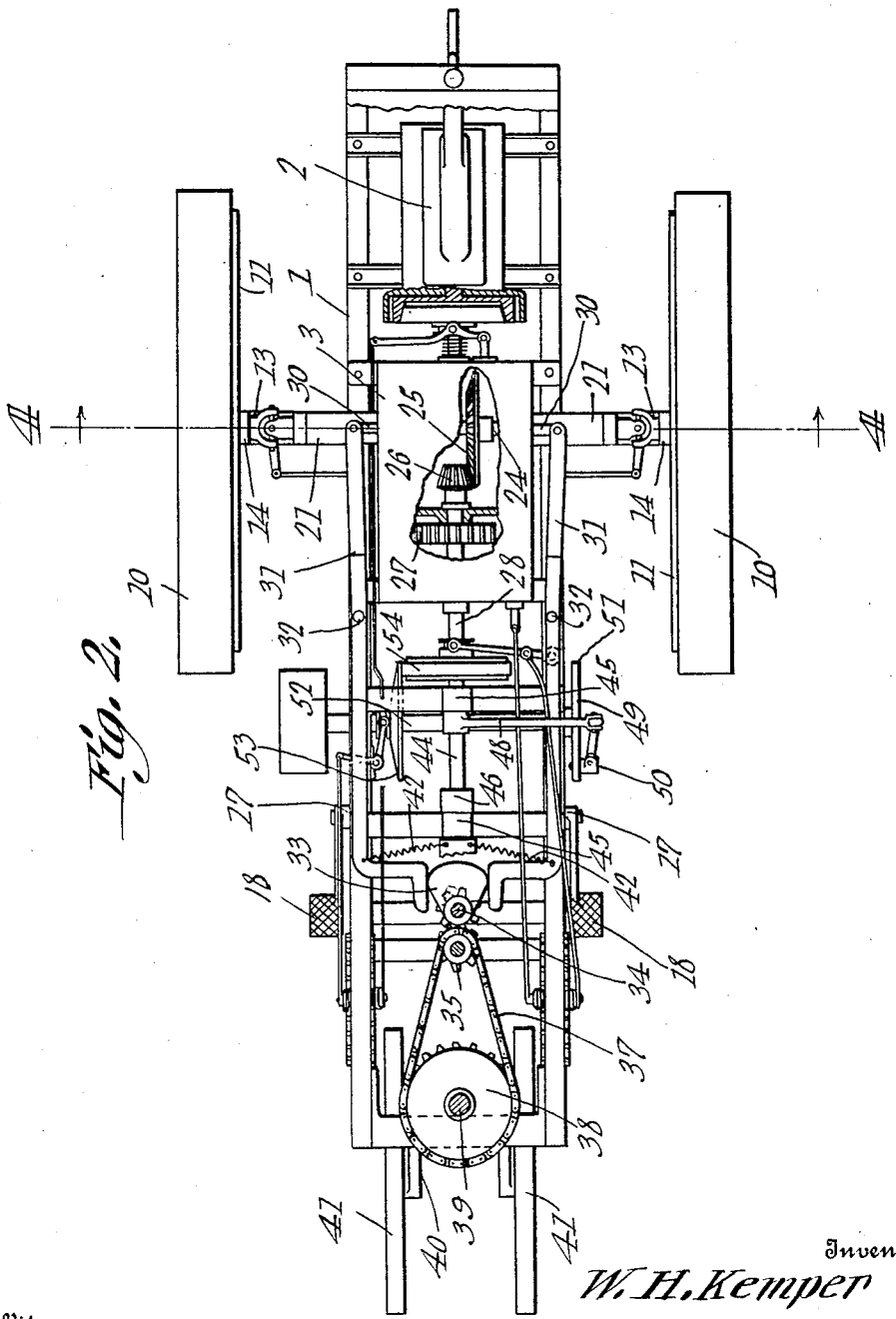

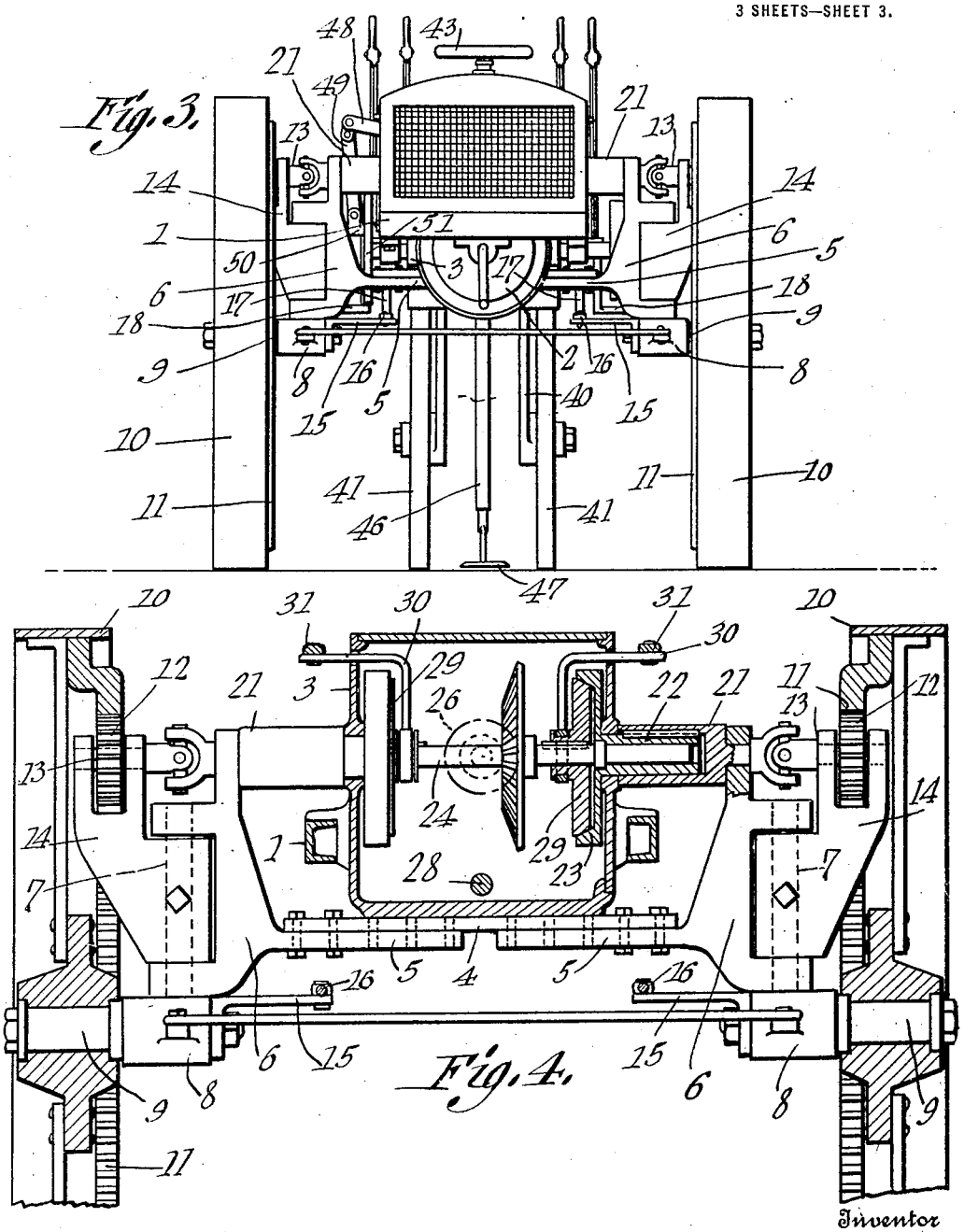

WILLIAM H. KEMPER, OF MONTGOMERY, ALABAMA.

AGRICULTURAL MACHINE.

1,417,999.  Specification of Letters Patent.  Patented May 30, 1922.

Application filed December 13, 1920. Serial No. 431,796.

*To all whom it may concern:*

Be it known that I, WILLIAM H. KEMPER, a citizen of the United States, residing at Montgomery, in the county of Montgomery and State of Alabama, have invented a new and useful Agricultural Machine, of which the following is a specification.

This invention relates to agricultural machines and more especially to a motor propelled machine the operation of which over a field can be easily controlled at all times, there being means combined therewith whereby a cotton chopper can be operated and various other agricultural implements can be connected to and operated by the machine.

A further object is to provide a machine of this character the wheel base of which can be widened, when desired to adapt the machine to straddle one or more rows.

Another object is to provide steering mechanism which is simple and efficient and is adapted to properly steer the machine both by shifting the rear wheels and by shifting the power from one to the other of the drive wheels.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a side view of the machine adapted for use as a cotton chopper.

Figure 2 is a plan view thereof.

Figure 3 is an end elevation.

Figure 4 is a transverse section on line 4—4, Figure 2.

Referring to the figures by characters of reference, 1 designates the frame of the machine the front portion of which supports a suitable motor 2, and secured to this frame is a housing 3 the bottom of which rests on and is secured to a bolster 4. Extending under and secured to the bolster are tongues 5 projecting inwardly from side yokes 6 and journaled in each yoke is a stem 7 projecting upwardly from a knuckle member 8 having a stub shaft 9 extending laterally therefrom. The drive wheels 10 of the machine rotate on these stub shafts and are provided with internal ring gears 11 meshing with pinions 12. Each pinion is secured to a short shaft 13 journaled in the forked upper end of a bracket 14 and the bracket extends into the yoke 6 and is secured to and rotates with the pin or stem 7. The pinion 12 is arranged within the fork of the bracket and is thus held against lateral displacement. Arms extend inwardly from the members 8, as shown at 15 and are connected by rods 16 to bell cranks 17 which are hung in the rear portion of the frame 1 and have foot pedals 18 adapted to be operated by the occupant of the seat 19. Springs 20 are provided for holding the pedals normally elevated. Thus it will be seen that, by means of the feet, the front wheels can, if desired, be turned to steer the machine.

Secured to each of the short shafts 13 is a sleeve 21 adapted to rotate therewith, the two sleeves being in alinement and extended inwardly toward each other. These sleeves are feathered on inner sleeves 22 having clutch members 23 secured to their inner ends and mounted for rotation in the sleeves is a transverse shaft 24. The sleeves are supported in suitable bearings carried by the housing 3 and allow the shafts 13 to be shifted longitudinally during the widening or narrowing of the machine.

A gear 25 is secured to the shaft 24 and is adapted to receive motion from a gear 26 which, in turn is driven by transmission gearing indicated generally at 27 and which transmission gearing is operated by the shaft 28 of the engine 2. Clutch members 29 are feathered on the shaft 24 and each is engaged by the forked end of a link 30 extending inwardly from a side lever 31. The two side levers extend rearwardly and are fulcrumed between their ends as indicated at 32. The rear ends of the side levers are inturned and extend to opposite sides of a shifting cam or segment 33 secured to the lower portion of a steering shaft 34 arranged in front of the seat 19. This shaft 34 transmits motion through gears 34′ to a sprocket 35 and an endless chain 37 engages this sprocket and also a sprocket 38 which is fastened to the pivot stem 39 of a rear supporting yoke 40. To this yoke are connected rear supporting wheels 41, as shown. Springs 42 connect the rear portions of the side levers to the center of the frame 1 and serve to hold the clutch members 29 normally in engagement with the clutch members 23 so that power transmitted to the shaft 24 from the engine will result in the actuation of both pinions 12 and both of the drive wheels 10. When it is desired to steer the machine the shaft 34 is turned by means of a hand wheel 43, as usual, thus causing the chain 36 to rotate the stem 39 and the yoke 40. At the same time the cam 33 will come against one of the rear ends of the levers 31 and shift said lever so as to uncouple its clutch members. Consequently power will be applied to only one of the drive wheels and the turning of the machine will thus be very abrupt and short.

The machine hereindescribed can be used for various purposes. For example it can be combined with cotton chopping mechanism as shown. With this arrangement a rock shaft 44 is mounted in suitable supports provided therefor, as shown at 45 and a hanger 46 is secured to the shaft so as to move therewith. A chopping blade 47 can be adjustably connected to the lower end of the hanger and will swing transversely of a row straddled by the machine, as will be obvious. An arm 48 is extended laterally from and is secured to the shaft 44 and is connected by a link 49 to a wrist pin 50 extending from a wheel 51. This wheel is secured to a transverse shaft 52 provided with a friction disk 53 which is engaged and driven by a friction disk 54 actuated by the engine shaft. Thus it will be seen that, during the operation of said engine shaft the wheel 51 will be rotated and will transmit motion through the link 49 to the rock shaft and thence to the chopping blade.

What is claimed is:—

1. In a machine of the class described the combination with a frame, front drive wheels mounted to swing relative thereto, means under the control of the driver for separately swinging said wheels, a motor driven shaft, a steering wheel, separate means controlled thereby for coupling either or both of the front drive wheels to the shaft, and means operated by said steering wheel for steering the machine, said means including rear supporting wheels, and motion transmitting means connecting the rear wheels to the steering wheel for swinging movement.

2. In a machine of the class described the combination with a frame, yokes connected to and adjustable laterally relative to the frame, and supporting wheels mounted to swing relative to and supporting the yokes, of gears upon the wheels and revoluble therewith, a motor driven shaft, telescopically connected pairs of sleeves revoluble together on the said shaft, a gear connected to one of the sleeves of each pair and meshing with the gear on one of the wheels, clutch members revoluble with the sleeves, clutch members feathered on the shaft, levers connected to the feathered clutch members, yielding means for holding the levers with the clutch members normally in engagement, a steering wheel, and means revoluble with the steering wheel for shifting either of said levers to uncouple one of the gears from the shaft.

3. In a machine of the class described the combination with a frame and laterally adjustable supporting wheels mounted to swing relative to the frame, of gears upon the wheels and revoluble therewith, a motor driven shaft, telescopically connected revoluble means, a gear connected to one of said means and meshing with one of the gears, normally engaging clutch members, means for disengaging the clutch members, a steering wheel, and means revoluble with the steering wheel for shifting the clutch to uncouple the gear from the motor driven shaft.

In testimony that I claim the foregoing as my own, I have hereto affixed my signature in the presence of two witnesses.

WILLIAM H. KEMPER.

Witnesses:
  JOHN O. SHANNON,
  CARRIE V. FINCHER.